(12) United States Patent
Jiang

(10) Patent No.: US 10,332,017 B2
(45) Date of Patent: Jun. 25, 2019

(54) INFORMATION PROCESSING METHOD AND ELECTRONIC DEVICE

(71) Applicant: Lenovo (Beijing) Co., Ltd., Haidian District, Beijing (CN)

(72) Inventor: Ying Jiang, Beijing (CN)

(73) Assignee: LENOVO (BEIJING) CO., LTD., Haidan District, Beijing (CN)

( * ) Notice: Subject to any disclaimer, the term of this patent is extended or adjusted under 35 U.S.C. 154(b) by 859 days.

(21) Appl. No.: 14/972,846

(22) Filed: Dec. 17, 2015

(65) Prior Publication Data

US 2017/0076218 A1  Mar. 16, 2017

(30) Foreign Application Priority Data

Sep. 14, 2015  (CN) .......................... 2015 1 0583741

(51) Int. Cl.
| | |
|---|---|
| *G06N 5/02* | (2006.01) |
| *G06N 5/04* | (2006.01) |
| *G06N 3/08* | (2006.01) |
| *G06N 7/00* | (2006.01) |
| *G06F 11/10* | (2006.01) |
| *G06N 20/00* | (2019.01) |

(52) U.S. Cl.
CPC ......... *G06N 7/005* (2013.01); *G06F 11/1008* (2013.01); *G06N 5/02* (2013.01); *G06N 5/022* (2013.01); *G06N 5/04* (2013.01); *G06N 20/00* (2019.01)

(58) Field of Classification Search
CPC .......... G06N 7/005; G06N 5/04; G06N 5/022; G06N 5/02; G06N 20/00; G06F 11/1008
USPC ......................................... 706/46, 12, 14, 59
See application file for complete search history.

(56) References Cited

U.S. PATENT DOCUMENTS

| | | | |
|---|---|---|---|
| 2009/0210772 A1* | 8/2009 | Noguchi | G06F 11/1068 714/764 |
| 2014/0105293 A1* | 4/2014 | George | H03M 7/3071 375/240.12 |

* cited by examiner

*Primary Examiner* — Ly D Pham
(74) *Attorney, Agent, or Firm* — Brinks Gilson & Lione; John C. Freeman

(57) ABSTRACT

An information processing method and an electronic device are described where the method includes determining, based on coding combination in a memory cell, an M-th page among N pages in the memory cell; obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value, L being a positive integer not greater than N−1.

19 Claims, 4 Drawing Sheets

INFORMATION PROCESSING METHOD AND ELECTRONIC DEVICE

This application claims priority to Chinese patent application No. 201510583741.1 filed on Sep. 14, 2015, the entire contents of which are incorporated herein by reference.

BACKGROUND

The present application relates to the field of electronic technique, and more particularly, to an information processing method and an electronic device.

With advantages of large capacity, fast rewrite speed, being suitable for storage of mass data etc., NAND Flash memory is therefore used in a wide variety of electronic devices, to improve performance of electronic devices.

In the prior art, according to a different level of voltage of an internal data memory cell, NAND Flash memory usually may be divided into a Single-Level Cell (i.e., SLC) in which only a single bit of data can be stored in a single memory cell, a Multi-Level Cell in which two bits of data can be stored in a single memory cell, and a Trinary-Level Cell in which three bits of data can be stored in a single memory cell, wherein different combination states of information in a single memory cell usually correspond to different voltage ranges through Gray coding, respectively.

Factors, such as an increase of number of times of writing Flash memory and data storage time becomes longer, make a voltage distribution rule change, different states overlap, so some bits have been inverted when reading the Flash, thus causing data errors, Error Checking and Correction (i.e., ECC) is therefore adopted for the data in the Flash, soft information (a ratio of a probability that a certain bit in a memory cell is 0 and a probability that the certain bit in the memory cell is 1) is inputted into a soft decoder to thereby implement error detection and correction on NAND Flash and reduce an error rate.

In the process of inventing technical solutions according to embodiments of the present application, the inventor of the present application finds that at least the following problem exists in the prior arts discussed above:

In the prior art, after unreliable data is still obtained after inputting the soft information into the soft decoder, soft information is no more adjusted or corrected, however, correctness of the soft information directly affects performance of the soft decoder, it is impossible to effectively reduce the error rate once the soft information is not accurate, so there is a technical problem of being impossible to effectively reduce the error rate in the prior art.

SUMMARY

Embodiments of the present application provide an information processing method and an electronic device, for solving the technical problem of being impossible to effectively reduce the error rate existing in the prior art, the technical effect of effectively reducing the error rate is achieved.

First, an embodiment of the present application provides an information processing method, comprising:

determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value, L being a positive integer not greater than N−1.

Optionally, obtaining, based on N−1 inter-page relationships between the M-th page and N−1 pages among the N pages except the M-th page, a first parameter specifically comprises:

determining a number of inversion times for which a bit in the M-th page is inverted after being outputted by a decoder;

determining, based on the M-th page and the number of inversion times, a first magnitude relationship between a current threshold voltage of the memory cell and an actual voltage to which the memory cell corresponds; and obtaining, based on N−1 inter-page sequence relationships between reading the M-th page and reading the N−1 pages among the N pages except the M-th page and the first magnitude relationship, a voltage adjustment parameter for adjusting the current threshold voltage.

Optionally, adjusting, based on the first parameter, a current probability value of probability of that each bit of L bits corresponding to L pages among the N−1 pages is represented as 0 or 1, as a first probability value specifically comprises:

adjusting, based on the voltage adjustment parameter, the first magnitude relationship as a second magnitude relationship different from the first magnitude relationship, adjusting, based on the second magnitude relationship, the current threshold voltage, to obtain a first threshold voltage;

when a j-th page among the L pages and the M-th page satisfy a first inter-page sequence relationship among the N-th inter-page sequence relationships, and the memory cell is at the first threshold voltage, adjusting each bit in the j-th page from a current first bit as a second bit, j being a positive integer not larger than L; and adjusting, based on the second bit, a current probability value of probability of that each bit in the j-th page is represented as 0 or 1, as the first probability value.

Optionally, obtaining, based on N−1 inter-page relationships between the M-th page and N−1 pages among the N pages except the M-th page, a first parameter specifically comprises:

when a current probability value of a bit in the M-th page is smaller than a first predetermined probability value, and it is determined that the bit in the M-th page has been inverted after being outputted by the decoder, determining a voltage value range of the memory cell; and obtaining, based on the voltage value range and N−1 inter-page sequence relationships between reading the M-th page and reading the N−1 pages among the N pages except the M-th page, a probability value adjustment parameter for adjusting the current probability value of each bit among the L bits in the L pages.

Optionally, adjusting, based on the first parameter, a current probability value of probability of that each bit of L bits corresponding to L pages among the N−1 pages is represented as 0 or 1, as a first probability value, L being a positive integer not greater than N−1 specifically comprises:

adjusting, based on the probability value adjustment parameter, the current probability value of each bit among the L bits in the L pages in the memory cell as the first probability value.

Optionally, obtaining, based on N−1 inter-page relationships between the M-th page and N−1 pages among the N pages except the M-th page, a first parameter specifically comprises:

obtaining, based on N−1 inter-page relationships between the M-th page and the N−1 pages among the N pages except the M-th page, a voltage adjustment parameter for adjusting a current threshold voltage of the memory cell and a probability value adjustment parameter for adjusting the current probability value of each bit among the L bits in the L pages.

Optionally, adjusting, based on the first parameter, a current probability value of probability of that each bit of L bits corresponding to L pages among the N−1 pages is represented as 0 or 1, as a first probability value specifically comprises:

adjusting, based on the voltage adjustment parameter, a first magnitude relationship between the current threshold voltage of the memory cell and an actual voltage to which the memory cell corresponds as a second magnitude relationship different from the first relationship, adjusting, based on the second magnitude relationship, the current threshold voltage as a first threshold voltage, adjusting each bit among the L bits of the L pages from a current first bit into a second bit; and adjusting, based on the second bit and the probability value adjustment parameter, the current probability value of each bit among the L bits of the L page as the first probability value.

Optionally, adjusting, based on the first parameter, a current probability value of probability of that each bit of L bits corresponding to L pages among the N−1 pages is represented as 0 or 1, as a first probability value specifically comprises:

when a current probability value of a bit in the M-th page is greater than a second predetermined probability value, and it is determined that the bit in the M-th page has been inverted after being outputted by the decoder, adjusting the current probability value of each bit among the N bits in the N pages in the memory cell as a first probability value indicating that each bit's probability of being represented as 0 or 1 is equal.

Optionally, after adjusting, based on the first parameter, a current probability value of probability of that each bit of L bits corresponding to L pages among the N−1 pages is represented as 0 or 1, as a first probability value, the method further comprises:

inputting the first probability value into the decoder.

Second, an embodiment of the present application further provides an electronic device, comprising:

a decoder;

a nonvolatile memory connected with the decoder, and specifically for:

determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value, L being a positive integer not greater than N−1.

Optionally, the nonvolatile memory is specifically for:

determining a number of inversion times for which a bit in the M-th page is inverted after being outputted by the decoder;

determining, based on the M-th page and the number of inversion times, a first magnitude relationship between a current threshold voltage of the memory cell and an actual voltage to which the memory cell corresponds; and obtaining, based on N−1 inter-page sequence relationships between reading the M-th page and reading the N−1 pages among the N pages except the M-th page and the first magnitude relationship, a voltage adjustment parameter for adjusting the current threshold voltage.

Optionally, the nonvolatile memory is specifically for:

adjusting, based on the voltage adjustment parameter, the first magnitude relationship as a second magnitude relationship different from the first magnitude relationship, adjusting, based on the second magnitude relationship, the current threshold voltage, to obtain a first threshold voltage;

when a j-th page among the L pages and the M-th page satisfy a first inter-page sequence relationship among the N-th inter-page sequence relationships, and the memory cell is at the first threshold voltage, adjusting each bit in the j-th page from a current first bit as a second bit, j being a positive integer not larger than L; and adjusting, based on the second bit, a current probability value of probability of that each bit in the j-th page is represented as 0 or 1, as the first probability value.

Optionally, the nonvolatile memory is specifically for:

when a current probability value of a bit in the M-th page is smaller than a first predetermined probability value, and it is determined that the bit in the M-th page has been inverted after being outputted by the decoder, determining a voltage value range of the memory cell; and obtaining, based on the voltage value range and N−1 inter-page sequence relationships between reading the M-th page and reading the N−1 pages among the N pages except the M-th page, a probability value adjustment parameter for adjusting the current probability value of each bit among the L bits in the L pages.

Optionally, the nonvolatile memory is specifically for:

adjusting, based on the probability value adjustment parameter, the current probability value of each bit among the L bits in the L pages in the memory cell as the first probability value.

Optionally, the nonvolatile memory is specifically for:

obtaining, based on N−1 inter-page relationships between the M-th page and the N−1 pages among the N pages except the M-th page, a voltage adjustment parameter for adjusting a current threshold voltage of the memory cell and a probability value adjustment parameter for adjusting the current probability value of each bit among the L bits in the L pages.

Optionally, the nonvolatile memory is specifically for:

adjusting, based on the voltage adjustment parameter, a first magnitude relationship between the current threshold voltage of the memory cell and an actual voltage to which the memory cell corresponds as a second magnitude relationship different from the first relationship, adjusting, based on the second magnitude relationship, the current threshold voltage as a first threshold voltage, adjusting each bit among the L bits of the L pages from a current first bit into a second bit; and adjusting, based on the second bit and the probability value adjustment parameter, the current probability value of each bit among the L bits of the L page as the first probability value.

Optionally, the nonvolatile memory is specifically for:

when a current probability value of a bit in the M-th page is greater than a second predetermined probability value, and it is determined that the bit in the M-th page has been inverted after being outputted by the decoder, adjusting the current probability value of each bit among the N bits in the N pages in the memory cell as a first probability value indicating that each bit's probability of being represented as 0 or 1 is equal.

Optionally, the nonvolatile memory is specifically for:

inputting the first probability value into the decoder.

Third, an embodiment of the present application further provides an electronic device, comprising a first determining unit for determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

a first obtaining unit for obtaining, based on N−1 inter-page relationships between the M-th page and N−1 pages among the N pages except the M-th page, a first parameter; and a first adjusting unit for adjusting, based on the first parameter, a current probability value of probability of that each bit of L bits corresponding to L pages among the N−1 pages is represented as 0 or 1, as a first probability value, L being a positive integer not greater than N−1.

One or more technical solutions provided in embodiments of the present application at least have the following technical effects or advantages:

In the technical solutions provided in the embodiments of the present application, the following means are adopted: determining, based on coding combination in a memory cell, an M-th page among N pages in the memory cell, wherein a number of inversion between 0 and 1 for two adjacent bits of the M-th page is less than a threshold value; obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value. That is to say, after determining a relatively reliable page in the memory cell, the first parameter for adjusting soft information in a corresponding bit in the memory cell is obtained based on page data that is relatively reliable, and further, adjustment on the soft information is performed based on the first parameter, thereby corrected soft information is obtained, accordingly, the technical effect of effectively reducing the error rate is achieved.

BRIEF DESCRIPTION OF THE DRAWINGS

In order to more clearly illustrate the technical solutions in the embodiments of the present application or in the prior art, drawings necessary for describing the embodiments will be briefly introduced below, obviously, for those of ordinary skill in the art, the following described drawings are only parts of embodiments of the present application.

DETAILED DESCRIPTION

Figure 1:
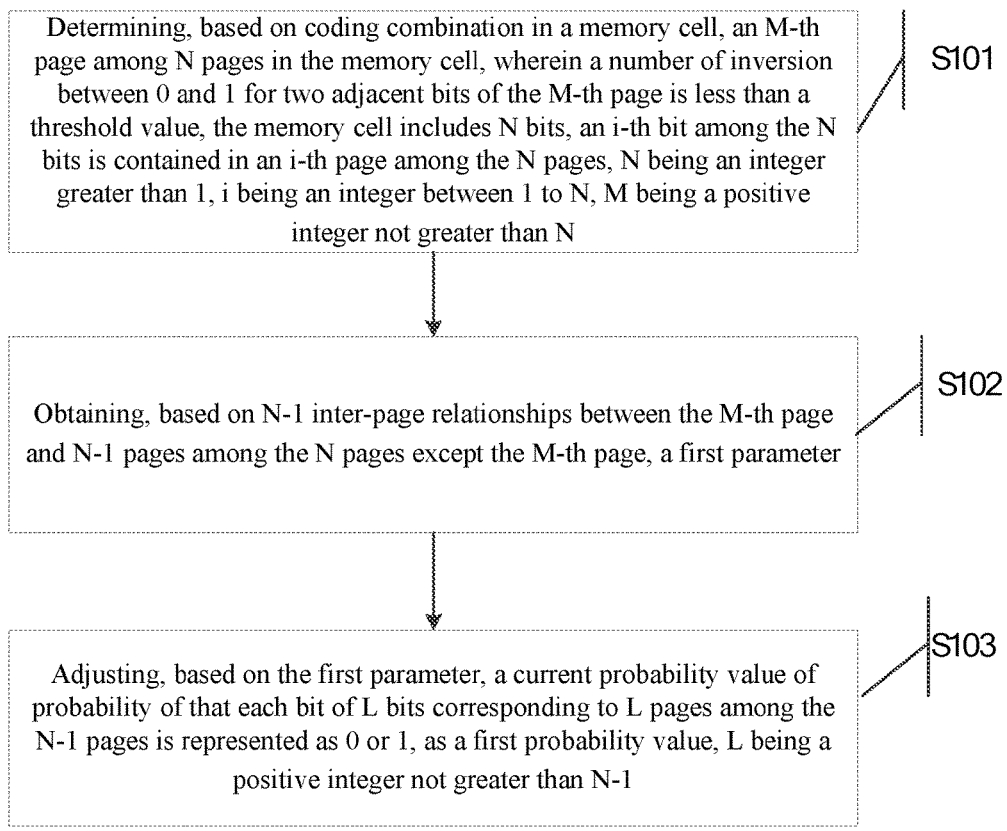
FIG. 1 is a flowchart of an information processing method provided by a first embodiment of the present application.
Figure 2:
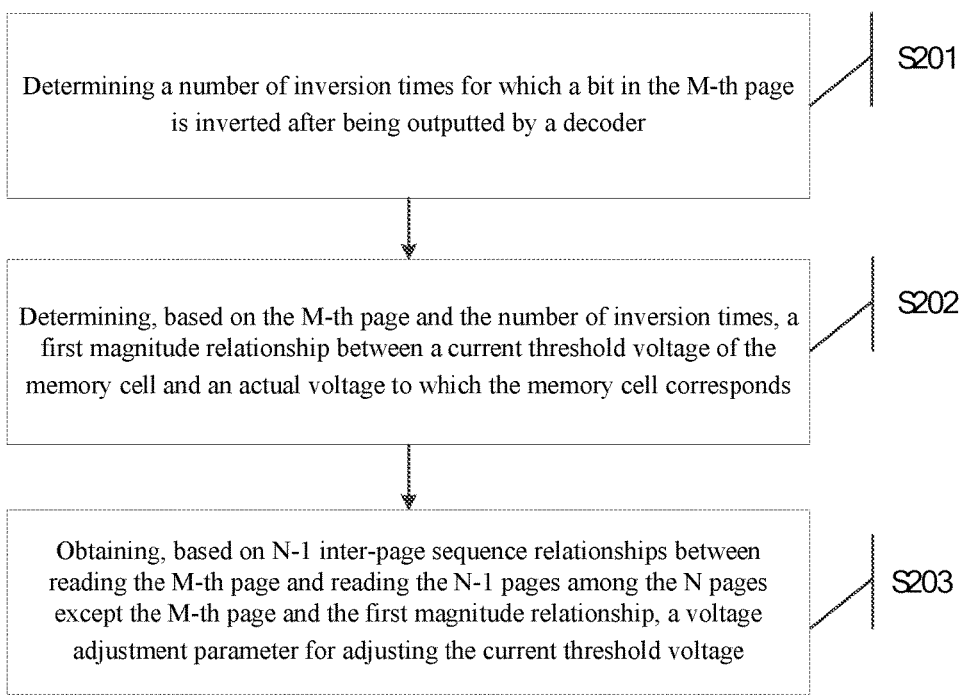
FIG. 2 is a process flowchart of step S102 in a first implementation of the information processing method provided by the first embodiment of the present application.

Embodiments of the present application provide an information processing method and an electronic device, for solving the technical problem that technical problem of being impossible to effectively reduce the error rate in the prior art, the technical effect of effectively reducing the error rate is achieved.

In order to solve the above technical problem, the technical solutions in the embodiments of the present application have a general concept as follows:

determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value, L being a positive integer not greater than N−1.

In the technical solutions provided in the embodiments of the present application, the following means are adopted: determining, based on coding combination in a memory cell, an M-th page among N pages in the memory cell, wherein a number of inversion between 0 and 1 for two adjacent bits of the M-th page is less than a threshold value; obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value. That is to say, after determining a relatively reliable page in the memory cell, the first parameter for adjusting soft information in a corresponding bit in the memory cell is obtained based on page data that is relatively reliable, and further, adjustment on the soft information is performed based on the first parameter, thereby corrected soft information is obtained, accordingly, the technical effect of effectively reducing the error rate is achieved.

To better understand the above technical solutions, hereinafter the technical solutions of the present application will be described in detail with reference to the accompanying drawings and the specific embodiments. It should be understood that embodiments of the present application and specific features thereof are detailed descriptions of the technical solutions of the present application, rather than limitations to the technical solutions of the present application, in the case of no conflict, the embodiments of the present application and specific features thereof may be combined.

First Embodiment

Referring to FIG. 1, the embodiment of the present application provides an information processing method, comprising:

S101: determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

S102: obtaining, based on N−1 inter-page relationships between the M-th page and N−1 pages among the N pages except the M-th page, a first parameter; and S103: adjusting, based on the first parameter, a current probability value of probability of that each bit of L bits corresponding to L pages among the N−1 pages is represented as 0 or 1, as a first probability value, L being a positive integer not greater than N−1.

In the embodiment of the present application, the memory cell specifically is a memory cell in NAND Flash, and data of NAND Flash is stored in the memory cell in mode of bit. In general, the memory cell is divided into, for example, SLC (Single-Level Cell, i.e., 1 bit/cell), MLC (Multi-Level Cell, i.e., 2 bits/cell), TLC (Trinary-Level Cell, i.e., 3 bits/cell), and so on. In addition, NAND Flash reads and writes data in unit of page. Since the embodiment of the present application mainly employs inter-page relationships, uses reliable pages to adjust soft information in bits to which unreliable pages correspond, so the technical solution of the embodiment of the present application is mainly addressed to the memory cell of MLC. However, the so-called reliable pages in the embodiment of the present application refers to based on Gray coding, determining one page whose threshold voltage bit changes with the least number of times, and considering this page as more reliable relative to the other pages. In addition, take TLC NAND Flash as example, each memory cell stores 3 bits information, belonging to three pages, respectively, and the 3 bits in each memory cell may be represented as LSB (Least Significant Bit), FSB (Framing Significant Bit), and MSB (Most Significant Bit), respectively. As for MLC NAND Flash, the two bits stored in each memory cell be represented as LSB and MSB, respectively.

In a specific implementation, detailed implementation processes of steps S101 to S103 are as follows:

First, determining, based on coding combination in a memory cell, an M-th page among N pages in the memory cell, wherein a number of inversion between 0 and 1 for two adjacent bits of the M-th page is less than a threshold value. Specifically, in the embodiment of present application, a coding manner commonly adopted in NAND Flash is Gray coding, for MLC NAND Flash in particular, a coding combination of 2 bits may have four kinds of coding, such as they may specifically be "11, 10, 00, 01", or "10, 11, 01, 00", or "01, 00, 10, 11", or "00, 01, 11, 10", four kinds of coding in total. For TLC NAND Flash in particular, a coding combination of 3 bits may have eight kinds of coding, for example, one coding among them may be "111, 011, 001, 101, 100, 000, 010, 110", all bits in an MSB page are "1, 0, 0, 1, 1, 0, 0, 1", all bits in an FSB page are "1, 1, 0, 0, 0, 0, 1, 1", and all bits in an LSB page are "1, 1, 1, 1, 0, 0, 0, 0"; another coding may be "100, 000, 010, 110, 111, 011, 001, 101", as for the other, details are omitted here. Those skilled in the art may set the coding combination of the memory cell as practically needed. In addition, for NAND Flash, a current coding of the memory cell may be determined through some testing manners, of course, a current coding associated with NAND Flash may also be provided by manufacturers of NAND flash, after determining the coding combination of the memory cell, it is possible to determined, based on coding combination in a memory cell, an M-th page (reliable page) among N pages in the memory cell, wherein a number of inversion between 0 and 1 for two adjacent bits of the M-th page is less than a threshold value. By way of specific example, for TLC NAND Flash, and coding of the memory cell is "111, 011, 001, 101, 100, 000, 010, 110", since the number of times for which two adjacent bits have inversion between 0 and 1 is 4 in the MSB page, the number of times for which two adjacent bits have inversion between 0 and 1 is 2 in the FSB page, and the number of times for which two adjacent bits have inversion between 0 and 1 is 1 in the LSB page. In this case, it shows that the LSB page is a more reliable page relative to the FSB page and the MSB page. Another example, for MLC NAND Flash, and coding of the memory cell is "11, 10, 00, 01", all bits in the MSB pages are "1, 1, 0, 0", all bits in the LSB page are "1, 0, 0, 1", since the number of times for which two adjacent bits have inversion between 0 and 1 is 1 in the MSB page, the number of times for which two adjacent bits have inversion between 0 and 1 is 2 in the LSB page. In this case, it shows that the MSB page is a more reliable page relative to the LSB page. Therefore, in the embodiment of the present application, selection of the reliable page depends on comprehensively considering the current coding combination of the memory cell and correction of decoding, the LSB page is not necessarily more reliable relative to other pages.

Then, after step S101: determining, based on coding combination in a memory cell, an M-th page among N pages in the memory cell, wherein a number of inversion between 0 and 1 for two adjacent bits of the M-th page is less than a threshold value, step S102 is executed: obtaining, based on N−1 inter-page relationships between the M-th page and N−1 pages among the N pages except the M-th page, a first parameter. Specifically, for TLC NAND Flash in particular, and the coding combination is "111, 011, 001, 101, 100, 000, 010, 110", the inter-page relationships are that reliability sequentially changes from high to low is: the LSB page, the FSB page, the MSB page.

Thereafter, step S103 is executed: adjusting, based on the first parameter, a current probability value of probability of that each bit of L bits corresponding to L pages among the N−1 pages is represented as 0 or 1, as a first probability value, L being a positive integer not greater than N−1. For example, when the LSB page is reliable and is correctly decoded, it may be used as a reference page for correcting a current probability value of probability of that a bit in the FSB page that is not correctly decoded is represented as 0 or 1. In the embodiment of the present application, since among the N pages of the memory cell, not all pages have a decoding error, only a current probability value of probability of that a bit in an incorrectly decoded page is represented as 0 or 1, is corrected based on the reliable page. In addition, in a case where one coding of the memory cell is such as "101", the highest significant bit is "1", the framing significant bit is "0", the lowest significant bit is "1", when the LSB page is reliable and the least significant bit "I" is correctly decoded, the framing significant bit is not correctly decoded, and the highest significant bit is correctly decoded, it only needs to, based on the LSB page, adjust soft information to which the FSB page's bit corresponds before reading the FSB page, without adjusting soft information to which the MSB page's bit corresponds before reading the MSB page, that is, only the incorrectly decoded bit's soft information is corrected.

In the embodiment of the present application, in order to obtain the first parameter for adjusting the soft information in the corresponding bit, step S102: obtaining, based on N−1 inter-page relationships between the M-th page and N−1 pages among the N pages except the M-th page, a first parameter, has, but not limited to, the following three implementations.

First Implementation

In the embodiment of the present application, the first implementation mainly is based on the reliable page and the number of inversion errors between 0 and 1 occurred in a bit before and after decoding, to obtain a voltage adjustment parameter for adjusting a current threshold voltage of the memory cell. Specifically, step S102: obtaining, based on N−1 inter-page relationships between the M-th page and N−1 pages among the N pages except the M-th page, a first parameter, specifically comprises the following steps:

S201: determining a number of inversion times for which a bit in the M-th page is inverted after being outputted by a decoder;

S202: determining, based on the M-th page and the number of inversion times, a first magnitude relationship between a current threshold voltage of the memory cell and an actual voltage to which the memory cell corresponds; and S203: obtaining, based on N−1 inter-page sequence relationships between reading the M-th page and reading the N−1 pages among the N pages except the M-th page and the first magnitude relationship, a voltage adjustment parameter for adjusting the current threshold voltage.

In a specific implementation, detailed implementation processes of steps S201 to S203 are as follows:

First, determining a number of inversion times for which a bit in the M-th page is inverted after being outputted by a decoder. That is to say, statistics are made to obtain the number of errors caused by that initial bit information in the reliable page inverts from 0 to 1 before and after decoding, and the number of errors caused by that initial bit information in the reliable page inverts from 1 to 0 before and after decoding. By way of specific example, when the LSB page is the reliable page, statistics are made to obtain the number of errors caused by that initial bit information inverts from 0 to 1 after LSB is decoded and outputted, and the number of errors caused by that initial bit information inverts from 1 to 0 after LSB is decoded and outputted. Thereafter, determining, based on the M-th page and the number of inversion times, a first magnitude relationship between a current threshold voltage of the memory cell and an actual voltage to which the memory cell corresponds. For example, a coding combination of the memory cell is "111, 011, 001, 101, 100, 000, 010, 110", all bits in the MSB page are "1, 0, 0, 1, 1, 0, 0, 1", all bits in the FSB page are "1, 1, 0, 0, 0, 0, 1, 1", and all bits in the LSB page are "1, 1, 1, 1, 0, 0, 0, 0", when the LSB page is the reliable page, in a case where the number of errors caused by that initial bit information inverts from 0 to 1 after LSB is decoded and outputted is greater than the number of errors caused by inverting from 1 to 0, it indicates that when reading NAND Flash, a threshold voltage set for the memory cell has a rightward offset relative to an actual voltage. In addition, the number of errors reflects how much the voltage offset is. Relationship between the number of errors and the voltage offset amount is related to properties inherent to NAND Flash, under normal circumstances, the more the number of errors is, the greater the voltage offset amount is. Besides, when the number of errors caused by that initial bit information inverts from 1 to 0 after LSB is decoded and outputted is greater than the number of errors caused by inverting from 0 to 1, it indicates that when reading NAND Flash, a threshold voltage set for the memory cell has a leftward offset relative to an actual voltage. Thereafter, obtaining, based on N−1 inter-page sequence relationships between reading the M-th page and reading the N−1 pages among the N pages except the M-th page and the first magnitude relationship, a voltage adjustment parameter for adjusting the current threshold voltage.

Figure 3:
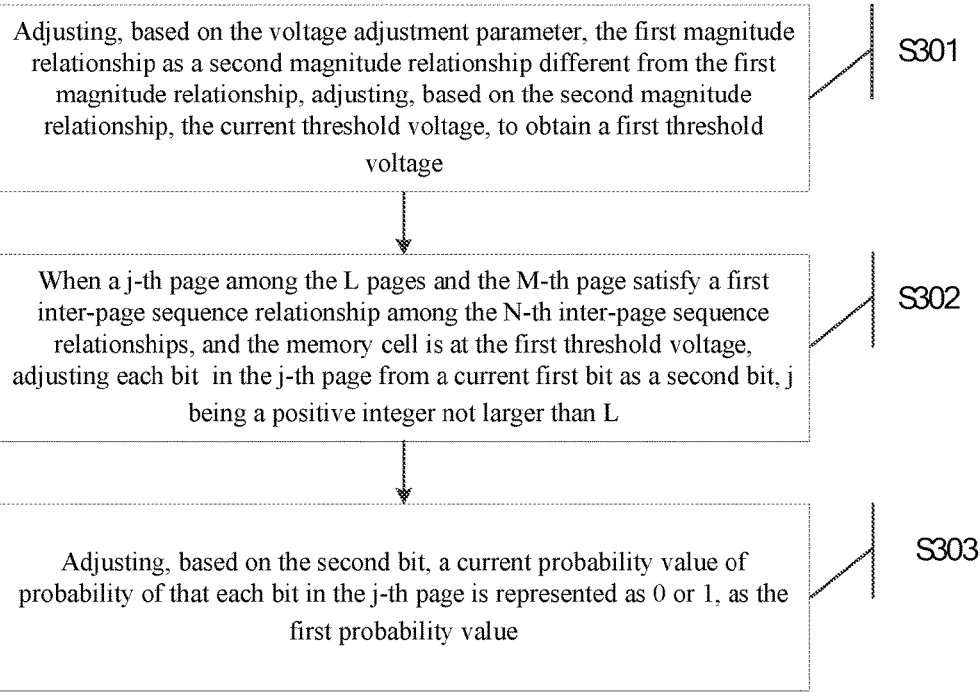
FIG. 3 is a process flowchart of step S103 in the first implementation of the information processing method provided by the first embodiment of the present application.

In the first implementation, referring to FIG. 3, step S103: adjusting, based on the first parameter, a current probability value of probability of that each bit of L bits corresponding to L pages among the N−1 pages is represented as 0 or 1, as a first probability value specifically comprises:

S301: adjusting, based on the voltage adjustment parameter, the first magnitude relationship as a second magnitude relationship different from the first magnitude relationship, adjusting, based on the second magnitude relationship, the current threshold voltage, to obtain a first threshold voltage;

S302: when a j-th page among the L pages and the M-th page satisfy a first inter-page sequence relationship among the N-th inter-page sequence relationships, and the memory cell is at the first threshold voltage, adjusting each bit in the j-th page from a current first bit as a second bit, j being a positive integer not larger than L; and S303: adjusting, based on the second bit, a current probability value of probability of that each bit in the j-th page is represented as 0 or 1, as the first probability value.

In a specific implementation, detailed implementation processes of steps S301 to S303 are as follows:

First, adjusting, based on the voltage adjustment parameter, the first magnitude relationship as a second magnitude relationship different from the first magnitude relationship, adjusting, based on the second magnitude relationship, the current threshold voltage, to obtain a first threshold voltage. Still with the following as example: a coding combination of the memory cell is "111, 011, 001, 101, 100, 000, 010, 110", all bits in the MSB page are "1, 0, 0, 1, 1, 0, 0, 1", all bits in the FSB page are "1, 1, 0, 0, 0, 0, 1, 1", and all bits in the LSB page are "1, 1, 1, 1, 0, 0, 0, 0", the LSB page is the reliable page, the number of errors caused by that initial bit information inverts from 0 to 1 after LSB is decoded and outputted is greater than the number of errors caused by inverting from 1 to 0, it indicates that when reading NAND Flash, a threshold voltage set for the memory cell has a rightward offset relative to an actual voltage. Accordingly, when reading a bit in the FSB page, the threshold voltage is offset to the left, thus adjusting the current threshold voltage of the memory cell as a first threshold voltage. Thereafter, when a j-th page among the L pages and the M-th page satisfy a first inter-page sequence relationship among the N-th inter-page sequence relationships, and the memory cell is at the first threshold voltage, adjusting each bit in the j-th page from a current first bit as a second bit, j being a positive integer not larger than L. Specifically, the first inter-page sequence relationship is to indicate that a reliable page and an unreliable page are of adjacency relationship. Still with that a coding combination of the memory cell is "111, 011, 001, 101, 100, 000, 010, 110" as example, LSB is the reliable page and is correctly decoded, when FSB is incorrectly decoded, initial bit information of FSB may be adjusted based on LSB when reading FSB. For example, a bit "1" to which inversion error occurs in the FSB page is corrected to bit "0". In this example, if MSB is also incorrectly decoded, still, an adjusted bit may be obtained for a bit in the MSB page by adjusting the threshold voltage of the memory cell. To sum up, an offset relationship between the current threshold voltage of the memory cell and the actual voltage thereof is determined based on the reliable page and the number of inversion errors between 0 and 1, offset adjustment that is contrary is performed on the current threshold voltage based on the offset relationship when reading other reliable pages, thereafter the adjusted bit information is obtained. Thereafter, adjusting, based on the second bit, a current probability value of probability of that each bit in the j-th page is represented as 0 or 1, as the first probability value. That is to say, while ensuring correctness of the initial bit information, correctness of soft information in a corresponding bit is ensured. In addition, in the embodiment of the present application, when adjusting the threshold voltage, it will concurrently affect information in 3 bits in the memory cell, when LSB is reliable and correctly decoded and FSB is incorrectly decoded, it only needs to use the adjusted FSB to again read Flash, and thereafter a decoding operation can be performed, without using the adjusted LSB to again read Flash.

Second Implementation

Figure 4:
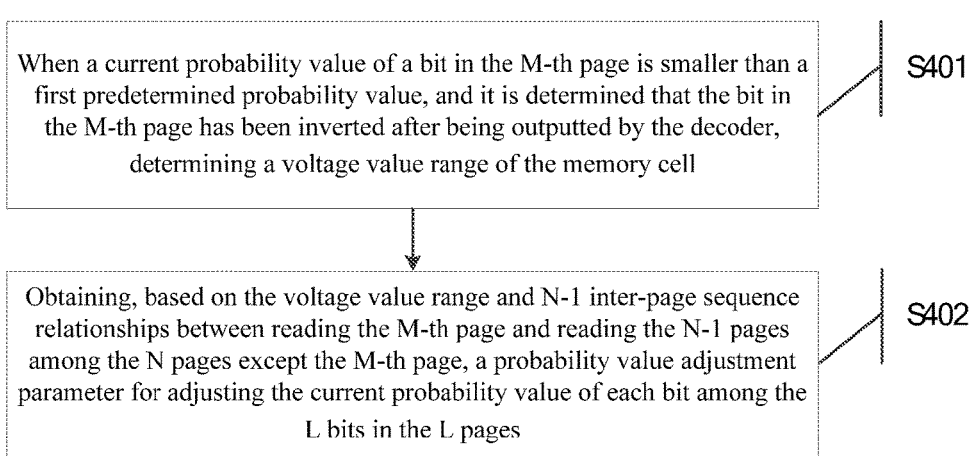
FIG. 4 is a process flowchart of step S102 in a second implementation of the information processing method provided by the first embodiment of the present application.

In the embodiment of the present application, the second implementation mainly is based on soft information in the relatively reliable page in the memory cell, to correspondingly adjust soft information in other pages. Specifically, referring to FIG. 4, step S102: obtaining, based on N−1 inter-page relationships between the M-th page and N−1 pages among the N pages except the M-th page, a first parameter, specifically comprises the following steps:

S401: when a current probability value of a bit in the M-th page is smaller than a first predetermined probability value, and it is determined that the bit in the M-th page has been inverted after being outputted by the decoder, determining a voltage value range of the memory cell; and S402: obtaining, based on the voltage value range and N−1 inter-page sequence relationships between reading the M-th page and reading the N−1 pages among the N pages except the M-th page, a probability value adjustment parameter for adjusting the current probability value of each bit among the L bits in the L pages.

In a specific implementation, detailed implementation processes of steps S101 to S103 are as follows:

Specifically, still with that a coding combination of the memory cell is "111, 011, 001, 101, 100, 000, 010, 110" as example, a possible voltage range interval for each memory cell may be "111" representing an A zone, "011" representing a B zone, "001" representing a C zone, "101" indicating a D zone, "100" indicating an E zone, "000" indicating an F zone, "010" indicating a G zone, and "110" indicating an H zone. If soft information in a certain bit in the LSB page is small, and its value is converted after being decoded and outputted, it shows that the voltage should be in the D zone or the E zone, in which two zones a bit to which FSB corresponds should be "0", a bit to which MSB corresponds should be "1", so, the soft information of FSB should be added with a probability of being "0", the soft information of MSB should be added with a probability of being "1". Specifically, a predetermined probability value (predetermined soft information) is set, for example, 3 bits "010" is used to indicate the predetermined probability value, when it is determined that soft information in a certain bit of LSB is "001", it is smaller than the predetermined soft information "010". In addition, since after LSB is decoded and outputted, its bit is converted, then it shows that a voltage range interval to which the memory cell currently corresponds should be in the D zone or the E zone. Thereafter, based on the voltage range interval of the memory cell and inter-page sequence relationships of reading the reliable LSB page and reading the FSB page and the MSB page, a probability value adjustment parameter for adjusting soft information to which each bit in the unreliable pages that are incorrectly decoded is obtained.

In the second implementation, step S103: adjusting, based on the first parameter, a current probability value of probability of that each bit of L bits corresponding to L pages among the N−1 pages is represented as 0 or 1, as a first probability value, L being a positive integer not greater than N−1 specifically comprises:

adjusting, based on the probability value adjustment parameter, the current probability value of each bit among the L bits in the L pages in the memory cell as the first probability value.

Still with that soft information in a certain bit in the LSB page is small, and its value is converted after being decoded and outputted as example, it shows that the voltage should be in the D zone or the E zone, in which two zones a bit to which FSB corresponds should be "0", a bit to which MSB corresponds should be "1", so, the soft information of FSB should be added with a probability of being "0", the soft information of MSB should be added with a probability of being "1". After obtaining the probability value adjustment parameter, soft information to which the incorrectly decoded FSB and MSB correspond may be adjusted. For example, as for LSB, soft information before adjustment is "001", soft information after adjustment is "011", and as for MSB, soft information before adjustment is "100", soft information after adjustment is "110." With the same adjusting method, when both LSB and MSB are incorrectly decoded, while FSB is correctly decoded, when certain soft information of FSB is small, and inversion occurs to its value after being decoded and outputted, it is determined that a voltage range where the memory cell is currently in should be one range among "B, C, F, G", in this case, MSB should be "0", therefore, a probability of being "0" may be added to MSB. Of course, those skilled in the art can adjust size of the soft information to which a bit in the memory cell corresponds according to actual coding and decoding situations of the memory cell, no more details repeated here.

Third Implementation

In the embodiment of the present application, the first and second implementations may be concurrently adopted to adjust soft information in a bit in a page that is incorrectly decoded. Specifically, in the third implementation, step S102: obtaining, based on N−1 inter-page relationships between the M-th page and N−1 pages among the N pages except the M-th page, a first parameter, specifically comprises the following steps:

obtaining, based on N−1 inter-page relationships between the M-th page and the N−1 pages among the N pages except the M-th page, a voltage adjustment parameter for adjusting a current threshold voltage of the memory cell and a probability value adjustment parameter for adjusting the current probability value of each bit among the L bits in the L pages.

Figure 5:
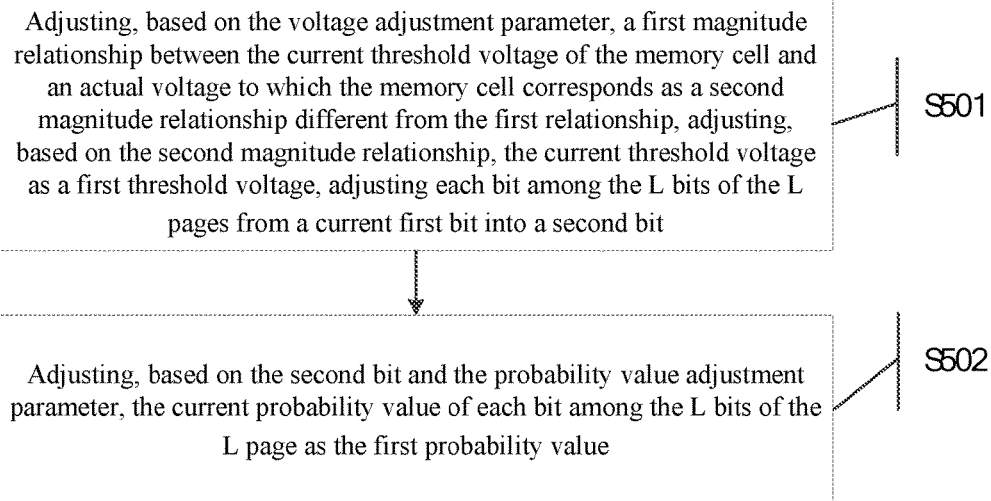
FIG. 5 is a process flowchart of step S103 in the second implementation of the information processing method provided by the first embodiment of the present application.

In the third implementation, referring to FIG. 5, step S103: adjusting, based on the first parameter, a current probability value of probability of that each bit of L bits corresponding to L pages among the N−1 pages is represented as 0 or 1, as a first probability value specifically comprises:

S501: adjusting, based on the voltage adjustment parameter, a first magnitude relationship between the current threshold voltage of the memory cell and an actual voltage to which the memory cell corresponds as a second magnitude relationship different from the first relationship, adjusting, based on the second magnitude relationship, the current threshold voltage as a first threshold voltage, adjusting each bit among the L bits of the L pages from a current first bit into a second bit; and S502: adjusting, based on the second bit and the probability value adjustment parameter, the current probability value of each bit among the L bits of the L page as the first probability value.

In a specific implementation, detailed implementation process of third implementation is as follows:

Specifically, after initial information in a certain bit of the memory cell is adjusted by adjusting an offset situation of the threshold voltage of the memory cell by means of the first implementation described above, when adjusted soft information is inputted into the decoder, decoding is still incorrect, in this case, it is possible to incorporate the second implementation, to perform a second adjustment on the soft information in a bit that is incorrectly decoded. Specifically, a voltage zone where an incorrectly decoded bit may emerge is further determined, and soft information to the associated bit corresponds is adjusted again. Of course, it may also be that a voltage zone where a bit, to which a decoding error occurs in the memory cell, may emerge is determined through relatively reliable soft information in the memory cell by means of the second implementation described above, thereafter corresponding adjustment is performed on soft information in the incorrectly decoded page. After inputting the adjusted soft information into the decoder, if decoding still is incorrect, in this case, it is possible to incorporate the first implementation, to perform a second adjustment on the soft information in a bit that is incorrectly decoded. Specifically, offset relationship between the current threshold voltage and the actual voltage can be determined based on the reliable page of the memory cell and the number of inversion errors of a bit between "0" and "1", to thereby obtain the adjusted initial bit information, and further soft information on which second adjustment has been performed is obtained.

Fourth Implementation

In the embodiment of the present application, because technology associated with NAND Flash cannot guarantee a Memory Array maintains a reliable performance in its life cycle, as a wearing degree of NAND Flash increases, the memory cell might be broken. So, the memory is probably broken, once a program or erase operation is performed on a broken memory cell, failure will appear. Therefore, in the embodiment of the present application, in addition to adjusting the soft information in a bit of the memory cell by means of the above three implementations, it is possible to perform a second adjustment on the soft information in a bit of the memory cell by incorporating the fourth implementation.

Specifically, the fourth implementation is mainly addressed to adjusting soft information of the memory cell that is probably broken. In the fourth implementation, step S103: adjusting, based on the first parameter, a current probability value of probability of that each bit of L bits corresponding to L pages among the N−1 pages is represented as 0 or 1, as a first probability value specifically comprises:

when a current probability value of a bit in the M-th page is greater than a second predetermined probability value, and it is determined that the bit in the M-th page has been inverted after being outputted by the decoder, adjusting the current probability value of each bit among the N bits in the N pages in the memory cell as a first probability value indicating that each bit's probability of being represented as 0 or 1 is equal.

In a specific implementation, specifically, still with that a coding combination of the memory cell is "111, 011, 001, 101, 100, 000, 010, 110" as example. If one of the following two conditions is met, then the memory cell might be broken, and fall into a particular state, but it is not limited to the following two conditions. Soft information in a corresponding bit of the memory cell is set as "0" at the time of decoding, it indicates that probability of that the bit in the memory cell is "0" and that of being "1" both are ½, for example, if there is a higher probability for the bit to be "1", then it is likely to decode the bit into "1" at the time of decoding, but an actually broken memory cell should have an equal probability of being interpreted into "0" or "1". While a first situation is that, LSB has large soft information in a certain bit, but its value is inverted after being decoded and outputted. Normally, when the LSB page is relatively reliable and a probability value to which the soft information thereof corresponds is also large, its value should not be inverted after being decoded and outputted. But in this case, decoding has an error, which shows that the memory cell might be broken. A second situation is that probability for that a bit in FSB is "0" is higher, its value should not be inverted after being decoded and outputted. But in this case, decoding has an error, which shows that the memory cell might be broken. After determining the memory cell that probably is broken, soft information to which the bit in the memory cell corresponds is adjusted as "0", to further improve a decoding convergence speed, which effectively reduces an error rate. Of course, those skilled in the art may design a variety of methods for determining that the memory cell is probably broken, which will not be illustrated one by one.

In addition, in the embodiment of the present, besides the four implementations described above, more implementations may be incorporated as needed in particular to implement adjustment on the soft information, until reliable soft information is obtained, details are omitted here.

In the embodiment of the present application, after step S103: adjusting, based on the first parameter, a current probability value of probability of that each bit of L bits corresponding to L pages among the N−1 pages is represented as 0 or 1, as a first probability value, the following step is executed:

inputting the first probability value into the decoder.

That is to say, the adjusted soft information is inputted into the decoder, to thereby implement error detection and correction on NAND Flash and reduce an error rate.

Second Embodiment

Figure 6:
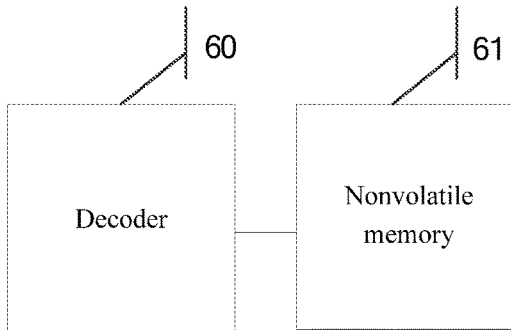
FIG. 6 is a structural block diagram of an electronic device provided by a second embodiment of the present application.

Referring to FIG. 6, based on the same invention concept as the first embodiment, the embodiment of the present application further provides an electronic device, comprising:

a decoder 60;

a nonvolatile memory 61 connected with the decoder 60, and specifically for:

determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value, L being a positive integer not greater than N−1.

In the embodiment of the present application, the nonvolatile memory 61 is specifically for:

determining a number of inversion times for which a bit in the M-th page is inverted after being outputted by the decoder 60;

determining, based on the M-th page and the number of inversion times, a first magnitude relationship between a current threshold voltage of the memory cell and an actual voltage to which the memory cell corresponds; and obtaining, based on N−1 inter-page sequence relationships between reading the M-th page and reading the N−1 pages among the N pages except the M-th page and the first magnitude relationship, a voltage adjustment parameter for adjusting the current threshold voltage.

In the embodiment of the present application, the nonvolatile memory 61 is specifically for:

adjusting, based on the voltage adjustment parameter, the first magnitude relationship as a second magnitude relationship different from the first magnitude relationship, adjusting, based on the second magnitude relationship, the current threshold voltage, to obtain a first threshold voltage;

when a j-th page among the L pages and the M-th page satisfy a first inter-page sequence relationship among the N-th inter-page sequence relationships, and the memory cell is at the first threshold voltage, adjusting each bit in the j-th page from a current first bit as a second bit, j being a positive integer not larger than L; and adjusting, based on the second bit, a current probability value of probability of that each bit in the j-th page is represented as 0 or 1, as the first probability value.

In the embodiment of the present application, the nonvolatile memory 61 is specifically for:

when a current probability value of a bit in the M-th page is smaller than a first predetermined probability value, and it is determined that the bit in the M-th page has been inverted after being outputted by the decoder 60, determining a voltage value range of the memory cell; and obtaining, based on the voltage value range and N−1 inter-page sequence relationships between reading the M-th page and reading the N−1 pages among the N pages except the M-th page, a probability value adjustment parameter for adjusting the current probability value of each bit among the L bits in the L pages.

In the embodiment of the present application, the nonvolatile memory 61 is specifically for:

adjusting, based on the probability value adjustment parameter, the current probability value of each bit among the L bits in the L pages in the memory cell as the first probability value.

In the embodiment of the present application, the nonvolatile memory 61 is specifically for:

obtaining, based on N−1 inter-page relationships between the M-th page and the N−1 pages among the N pages except the M-th page, a voltage adjustment parameter for adjusting a current threshold voltage of the memory cell and a probability value adjustment parameter for adjusting the current probability value of each bit among the L bits in the L pages.

In the embodiment of the present application, the nonvolatile memory 61 is specifically for:

adjusting, based on the voltage adjustment parameter, a first magnitude relationship between the current threshold voltage of the memory cell and an actual voltage to which the memory cell corresponds as a second magnitude relationship different from the first relationship, adjusting, based on the second magnitude relationship, the current threshold voltage as a first threshold voltage, adjusting each bit among the L bits of the L pages from a current first bit into a second bit; and adjusting, based on the second bit and the probability value adjustment parameter, the current probability value of each bit among the L bits of the L page as the first probability value.

In the embodiment of the present application, the nonvolatile memory 61 is specifically for:

when a current probability value of a bit in the M-th page is greater than a second predetermined probability value, and it is determined that the bit in the M-th page has been inverted after being outputted by the decoder, adjusting the current probability value of each bit among the N bits in the N pages in the memory cell as a first probability value indicating that each bit's probability of being represented as 0 or 1 is equal.

In the embodiment of the present application, the nonvolatile memory 61 is specifically for:

inputting the first probability value into the decoder 60.

Third Embodiment

Figure 7:
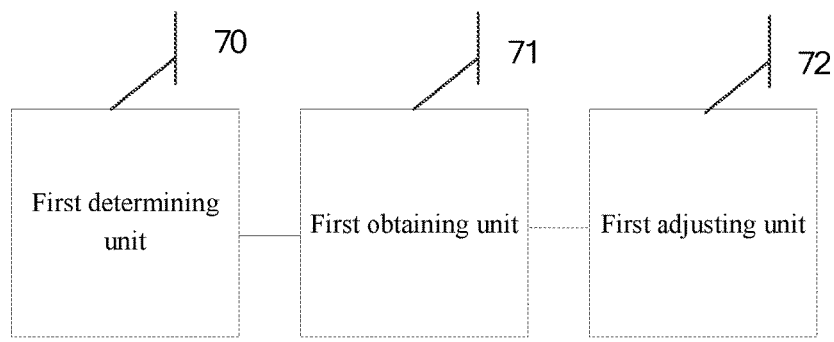
FIG. 7 is a structural block diagram of an electronic device provided by a third embodiment of the present application.

Referring to FIG. 7, based on the same invention concept as the first embodiment, the embodiment of the present application further provides an electronic device, comprising a first determining unit 70 for determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

a first obtaining unit 71 for obtaining, based on N−1 inter-page relationships between the M-th page and N−1 pages among the N pages except the M-th page, a first parameter; and a first adjusting unit 72 for adjusting, based on the first parameter, a current probability value of probability of that each bit of L bits corresponding to L pages among the N−1 pages is represented as 0 or 1, as a first probability value, L being a positive integer not greater than N−1.

In the embodiment of the present application, the first obtaining unit 71 specifically includes:

a first determining module for determining a number of inversion times for which a bit in the M-th page is inverted after being outputted by the decoder;

a second determining module for determining, based on the M-th page and the number of inversion times, a first magnitude relationship between a current threshold voltage of the memory cell and an actual voltage to which the memory cell corresponds; and a first obtaining module for obtaining, based on N−1 inter-page sequence relationships between reading the M-th page and reading the N−1 pages among the N pages except the M-th page and the first magnitude relationship, a voltage adjustment parameter for adjusting the current threshold voltage.

In the embodiment of the present application, the first adjusting unit 72 specifically includes:

a second obtaining unit for adjusting, based on the voltage adjustment parameter, the first magnitude relationship as a second magnitude relationship different from the first magnitude relationship, adjusting, based on the second magnitude relationship, the current threshold voltage, to obtain a first threshold voltage;

a first adjusting module for when a j-th page among the L pages and the M-th page satisfy a first inter-page sequence relationship among the N-th inter-page sequence relationships, and the memory cell is at the first threshold voltage, adjusting each bit in the j-th page from a current first bit as a second bit, j being a positive integer not larger than L; and a second adjusting module for adjusting, based on the second bit, a current probability value of probability of that each bit in the j-th page is represented as 0 or 1, as the first probability value.

In the embodiment of the present application, the first obtaining unit 71 specifically includes:

a third determining module for when a current probability value of a bit in the M-th page is smaller than a first predetermined probability value, and it is determined that the bit in the M-th page has been inverted after being outputted by the decoder, determining a voltage value range of the memory cell; and a third obtaining module for obtaining, based on the voltage value range and N−1 inter-page sequence relationships between reading the M-th page and reading the N−1 pages among the N pages except the M-th page, a probability value adjustment parameter for adjusting the current probability value of each bit among the L bits in the L pages.

In the embodiment of the present application, the first adjusting unit 72 specifically is:

a first probability value adjusting unit for adjusting, based on the probability value adjustment parameter, the current probability value of each bit among the L bits in the L pages in the memory cell as the first probability value.

In the embodiment of the present application, the first obtaining unit 71 specifically is:

an adjustment parameter obtaining unit for obtaining, based on N−1 inter-page relationships between the M-th page and the N−1 pages among the N pages except the M-th page, a voltage adjustment parameter for adjusting a current threshold voltage of the memory cell and a probability value adjustment parameter for adjusting the current probability value of each bit among the L bits in the L pages.

In the embodiment of the present application, the first adjusting unit 72 specifically includes:

a third adjusting module for adjusting, based on the voltage adjustment parameter, a first magnitude relationship between the current threshold voltage of the memory cell and an actual voltage to which the memory cell corresponds as a second magnitude relationship different from the first relationship, adjusting, based on the second magnitude relationship, the current threshold voltage as a first threshold voltage, adjusting each bit among the L bits of the L pages from a current first bit into a second bit; and a fourth adjusting module for adjusting, based on the second bit and the probability value adjustment parameter, the current probability value of each bit among the L bits of the L page as the first probability value.

In the embodiment of the present application, the first adjusting unit 72 specifically is:

a second probability value adjusting unit for when a current probability value of a bit in the M-th page is greater than a second predetermined probability value, and it is determined that the bit in the M-th page has been inverted after being outputted by the decoder, adjusting the current probability value of each bit among the N bits in the N pages in the memory cell as a first probability value indicating that each bit's probability of being represented as 0 or 1 is equal.

In the embodiment of the present application, after adjusting, based on the first parameter, a current probability value of probability of that each bit of L bits corresponding to L pages among the N−1 pages is represented as 0 or 1, as a first probability value, the electronic device further comprises:

a first inputting unit for inputting the first probability value into the decoder.

One or more technical solutions provided in embodiments of the present application at least have the following technical effects or advantages:

In the technical solutions provided in the embodiments of the present application, the following means are adopted: determining, based on coding combination in a memory cell, an M-th page among N pages in the memory cell, wherein a number of inversion between 0 and 1 for two adjacent bits of the M-th page is less than a threshold value; obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value. That is to say, after determining a relatively reliable page in the memory cell, the first parameter for adjusting soft information in a corresponding bit in the memory cell is obtained based on page data that is relatively reliable, and further, adjustment on the soft information is performed based on the first parameter, thereby corrected soft information is obtained, accordingly, the technical effect of effectively reducing the error rate is achieved.

In the technical solutions provided in the embodiments of the present application, the following means are adopted: determining a number of inversion times for which a bit in the M-th page is inverted after being outputted by a decoder; determining, based on the M-th page and the number of inversion times, a first magnitude relationship between a current threshold voltage of the memory cell and an actual voltage to which the memory cell corresponds; and obtaining, based on N−1 inter-page sequence relationships between reading the M-th page and reading the N−1 pages among the N pages except the M-th page and the first magnitude relationship, a voltage adjustment parameter for adjusting the current threshold voltage; adjusting, based on the voltage adjustment parameter, the first magnitude relationship as a second magnitude relationship different from the first magnitude relationship, adjusting, based on the second magnitude relationship, the current threshold voltage, to obtain a first threshold voltage; when a j-th page among the L pages and the M-th page satisfy a first inter-page sequence relationship among the N-th inter-page sequence relationships, and the memory cell is at the first threshold voltage, adjusting each bit in the j-th page from a current first bit as a second bit, j being a positive integer not larger than L; and adjusting, based on the second bit, a current probability value of probability of that each bit in the j-th page is represented as 0 or 1, as the first probability value. That is to say, the embodiment of the present application provides certain reference information for adjusting the offset of the threshold voltage of the memory cell (such as based on the number of times that the initial bit information is converted from "0" to "1" after being decoded and outputted, reference information is provided for adjusting offset of the threshold voltage), therefore, it is ensured that a voltage range where the memory cell is in is determined more correctly.

In the technical solutions provided in the embodiments of the present application, the following means are adopted: when a current probability value of a bit in the M-th page is smaller than a first predetermined probability value, and it is determined that the bit in the M-th page has been inverted after being outputted by the decoder, determining a voltage value range of the memory cell; and obtaining, based on the voltage value range and N−1 inter-page sequence relationships between reading the M-th page and reading the N−1 pages among the N pages except the M-th page, a probability value adjustment parameter for adjusting the current probability value of each bit among the L bits in the L pages; adjusting, based on the probability value adjustment parameter, the current probability value of each bit among the L bits in the L pages in the memory cell as the first probability value. That is to say, the probability that the reliable bit information is "0" to "1" is increased, thereafter the adjusted probability value is inputted into the decoder, decoding convergence speed of the decoder is effectively increased, the technical effect of effectively reducing an error rate is achieved.

In the technical solutions provided in the embodiments of the present application, the following means are adopted: when a current probability value of a bit in the M-th page is greater than a second predetermined probability value, and it is determined that the bit in the M-th page has been inverted after being outputted by the decoder, adjusting the current probability value of each bit among the N bits in the N pages in the memory cell as a first probability value indicating that each bit's probability of being represented as 0 or 1 is equal. That is to say, after determining the memory cell that is reliable and probably is broken, its soft information is adjusted as "0", thereafter the adjusted probability value is inputted into the decoder, therefore, decoding convergence speed of the decoder is effectively increased, the technical effect of effectively reducing an error rate is achieved.

Those skilled in the art should understand that, the embodiments of the present application can be provided as a method, a system or a computer program product. Therefore, the present application can adopt forms of a full hardware embodiment, a full software embodiment, or an embodiment combining software and hardware aspects. And, the present application can adopt forms of a computer program product implemented on one or more computer usable storage mediums (including, but not limited to, magnetic disk storage, CD-ROM, optical memory, or the like) including computer usable program codes.

The present application is described by referring to flow charts and/or block diagrams of method, apparatus (system) and computer program product according to the embodiments of the present application. It should be understood that each flow and/or block in the flow charts and/or block diagrams and the combination of the flow and/or block in the flow charts and/or block diagrams can be implemented by computer program instructions. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processors of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

In particular, the computer program instructions to which the information processing method in the embodiments of the present application correspond can be stored in an optical disk, a hard disk, and other storage medium, when the computer program instructions corresponding to the information processing method as stored in the storage medium are read or executed by an electronic device, the following steps are comprised:

determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value, L being a positive integer not greater than N−1.

Optionally, in the process that the computer instruction corresponding to the step of obtaining, based on N−1 inter-page relationships between the M-th page and N−1 pages among the N pages except the M-th page, a first parameter as stored in the storage medium is executed, the following step is comprised in particular:

determining a number of inversion times for which a bit in the M-th page is inverted after being outputted by a decoder;

determining, based on the M-th page and the number of inversion times, a first magnitude relationship between a current threshold voltage of the memory cell and an actual voltage to which the memory cell corresponds; and obtaining, based on N−1 inter-page sequence relationships between reading the M-th page and reading the N−1 pages among the N pages except the M-th page and the first magnitude relationship, a voltage adjustment parameter for adjusting the current threshold voltage.

Optionally, in the process that the computer instruction corresponding to the step of adjusting, based on the first parameter, a current probability value of probability of that each bit of L bits corresponding to L pages among the N−1 pages is represented as 0 or 1, as a first probability value as stored in the storage medium is executed, the following step is comprised in particular:

adjusting, based on the voltage adjustment parameter, the first magnitude relationship as a second magnitude relationship different from the first magnitude relationship, adjusting, based on the second magnitude relationship, the current threshold voltage, to obtain a first threshold voltage;

when a j-th page among the L pages and the M-th page satisfy a first inter-page sequence relationship among the N-th inter-page sequence relationships, and the memory cell is at the first threshold voltage, adjusting each bit in the j-th page from a current first bit as a second bit, j being a positive integer not larger than L; and adjusting, based on the second bit, a current probability value of probability of that each bit in the j-th page is represented as 0 or 1, as the first probability value.

Optionally, in the process that the computer instruction corresponding to the step of obtaining, based on N−1 inter-page relationships between the M-th page and N−1 pages among the N pages except the M-th page, a first parameter as stored in the storage medium is executed, the following step is comprised in particular:

when a current probability value of a bit in the M-th page is smaller than a first predetermined probability value, and it is determined that the bit in the M-th page has been inverted after being outputted by the decoder, determining a voltage value range of the memory cell; and obtaining, based on the voltage value range and N−1 inter-page sequence relationships between reading the M-th page and reading the N−1 pages among the N pages except the M-th page, a probability value adjustment parameter for adjusting the current probability value of each bit among the L bits in the L pages.

Optionally, in the process that the computer instruction corresponding to the step of adjusting, based on the first parameter, a current probability value of probability of that each bit of L bits corresponding to L pages among the N−1 pages is represented as 0 or 1, as a first probability value, L being a positive integer not greater than N−1 as stored in the storage medium is executed, the following step is comprised in particular:

adjusting, based on the probability value adjustment parameter, the current probability value of each bit among the L bits in the L pages in the memory cell as the first probability value.

Optionally, in the process that the computer instruction corresponding to the step of obtaining, based on N−1 inter-page relationships between the M-th page and N−1 pages among the N pages except the M-th page, a first parameter as stored in the storage medium is executed, the following step is comprised in particular:

obtaining, based on N−1 inter-page relationships between the M-th page and the N−1 pages among the N pages except the M-th page, a voltage adjustment parameter for adjusting a current threshold voltage of the memory cell and a probability value adjustment parameter for adjusting the current probability value of each bit among the L bits in the L pages.

Optionally, in the process that the computer instruction corresponding to the step of adjusting, based on the first parameter, a current probability value of probability of that each bit of L bits corresponding to L pages among the N−1 pages is represented as 0 or 1, as a first probability value as stored in the storage medium is executed, the following step is comprised in particular:

adjusting, based on the voltage adjustment parameter, a first magnitude relationship between the current threshold voltage of the memory cell and an actual voltage to which the memory cell corresponds as a second magnitude relationship different from the first relationship, adjusting, based on the second magnitude relationship, the current threshold voltage as a first threshold voltage, adjusting each bit among the L bits of the L pages from a current first bit into a second bit; and adjusting, based on the second bit and the probability value adjustment parameter, the current probability value of each bit among the L bits of the L page as the first probability value.

Optionally, in the process that the computer instruction corresponding to the step of adjusting, based on the first parameter, a current probability value of probability of that each bit of L bits corresponding to L pages among the N−1 pages is represented as 0 or 1, as a first probability value as stored in the storage medium is executed, the following step is comprised in particular:

when a current probability value of a bit in the M-th page is greater than a second predetermined probability value, and it is determined that the bit in the M-th page has been inverted after being outputted by the decoder, adjusting the current probability value of each bit among the N bits in the N pages in the memory cell as a first probability value indicating that each bit's probability of being represented as 0 or 1 is equal.

Optionally, the storage medium further stores some other computer instructions, in the process that the computer instruction corresponding to the step of after adjusting, based on the first parameter, a current probability value of probability of that each bit of L bits corresponding to L pages among the N−1 pages is represented as 0 or 1, as a first probability value, these other computer instructions are executed, in which process the following step is comprised in particular:

inputting the first probability value into the decoder.

Although the preferred embodiments of the present application have been described, those skilled in the art can make additional changes and modifications to these embodiments once learning the basic inventive concepts thereof. Therefore, the appended claims are intended to be interpreted as including the preferred embodiments as well as all changes and modifications that fall into the scope of the present application.

Obviously, those skilled in the art can make various modifications and variations to the present application without departing from the spirit and scope thereof. Thus, if these modifications and variations of the present application are within the scope of the claims of the application as well as their equivalents, the present application is also intended to include these modifications and variations.

The invention claimed is:

1. An information processing method comprising:
  determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value, L being a positive integer not greater than N−1.

2. The method of claim 1, wherein obtaining, based on N−1 inter-page relationships between the M-th page and N−1 pages among the N pages except the M-th page, a first parameter comprises:

determining a number of inversion times for which a bit in the M-th page is inverted after being outputted by a decoder;

determining, based on the M-th page and the number of inversion times, a first magnitude relationship between a current threshold voltage of the memory cell and an actual voltage to which the memory cell corresponds; and obtaining, based on N−1 inter-page sequence relationships between reading the M-th page and reading the N−1 pages among the N pages except the M-th page and the first magnitude relationship, a voltage adjustment parameter for adjusting the current threshold voltage.

3. The method of claim 2, wherein adjusting, based on the first parameter, a current probability value of probability of that each bit of L bits corresponding to L pages among the N−1 pages is represented as 0 or 1, as a first probability value comprises:

adjusting, based on the voltage adjustment parameter, the first magnitude relationship as a second magnitude relationship different from the first magnitude relationship, adjusting, based on the second magnitude relationship, the current threshold voltage, to obtain a first threshold voltage;

when a j-th page among the L pages and the M-th page satisfy a first inter-page sequence relationship among the N-th inter-page sequence relationships, and the memory cell is at the first threshold voltage, adjusting each bit in the j-th page from a current first bit as a second bit, j being a positive integer not larger than L; and adjusting, based on the second bit, a current probability value of probability of that each bit in the j-th page is represented as 0 or 1, as the first probability value.

4. The method of claim 1, wherein obtaining, based on N−1 inter-page relationships between the M-th page and N−1 pages among the N pages except the M-th page, a first parameter comprises:

when a current probability value of a bit in the M-th page is smaller than a first predetermined probability value, and it is determined that the bit in the M-th page has been inverted after being outputted by the decoder, determining a voltage value range of the memory cell; and obtaining, based on the voltage value range and N−1 inter-page sequence relationships between reading the M-th page and reading the N−1 pages among the N pages except the M-th page, a probability value adjustment parameter for adjusting the current probability value of each bit among the L bits in the L pages.

5. The method of claim 4, wherein adjusting, based on the first parameter, a current probability value of probability of that each bit of L bits corresponding to L pages among the N−1 pages is represented as 0 or 1, as a first probability value, L being a positive integer not greater than N−1 comprises adjusting, based on the probability value adjustment parameter, the current probability value of each bit among the L bits in the L pages in the memory cell as the first probability value.

6. The method of claim 1, wherein obtaining, based on N−1 inter-page relationships between the M-th page and N−1 pages among the N pages except the M-th page, a first parameter comprises obtaining, based on N−1 inter-page relationships between the M-th page and the N−1 pages among the N pages except the M-th page, a voltage adjustment parameter for adjusting a current threshold voltage of the memory cell and a probability value adjustment parameter for adjusting the current probability value of each bit among the L bits in the L pages.

7. The method of claim 6, wherein adjusting, based on the first parameter, a current probability value of probability of that each bit of L bits corresponding to L pages among the N−1 pages is represented as 0 or 1, as a first probability value comprises:

adjusting, based on the voltage adjustment parameter, a first magnitude relationship between the current threshold voltage of the memory cell and an actual voltage to which the memory cell corresponds as a second magnitude relationship different from the first relationship, adjusting, based on the second magnitude relationship, the current threshold voltage as a first threshold voltage, adjusting each bit among the L bits of the L pages from a current first bit into a second bit; and adjusting, based on the second bit and the probability value adjustment parameter, the current probability value of each bit among the L bits of the L page as the first probability value.

8. The method of claim 1, wherein adjusting, based on the first parameter, a current probability value of probability of that each bit of L bits corresponding to L pages among the N−1 pages is represented as 0 or 1, as a first probability value comprises when a current probability value of a bit in the M-th page is greater than a second predetermined probability value, and it is determined that the bit in the M-th page has been inverted after being outputted by the decoder, adjusting the current probability value of each bit among the N bits in the N pages in the memory cell as a first probability value indicating that each bit's probability of being represented as 0 or 1 is equal.

9. The method of claim 1, wherein after adjusting, based on the first parameter, a current probability value of probability of that each bit of L bits corresponding to L pages among the N−1 pages is represented as 0 or 1, as a first probability value, the method further comprises inputting the first probability value into the decoder.

10. An electronic device, comprising:

a decoder;

a nonvolatile memory connected with the decoder for:

determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

obtaining, based on N−1 inter-page relationships between the M-th page and N−1 pages among the N pages except the M-th page, a first parameter; and adjusting, based on the first parameter, a current probability value of probability of that each bit of L bits corresponding to L pages among the N−1 pages is represented as 0 or 1, as a first probability value, L being a positive integer not greater than N−1.

11. The electronic device of claim 10, wherein the non-volatile memory:

determines a number of inversion times for which a bit in the M-th page is inverted after being outputted by the decoder;

determines, based on the M-th page and the number of inversion times, a first magnitude relationship between a current threshold voltage of the memory cell and an actual voltage to which the memory cell corresponds; and obtains, based on N−1 inter-page sequence relationships between reading the M-th page and reading the N−1 pages among the N pages except the M-th page and the first magnitude relationship, a voltage adjustment parameter for adjusting the current threshold voltage.

12. The electronic device of claim 11, wherein the non-volatile memory:

adjusts, based on the voltage adjustment parameter, the first magnitude relationship as a second magnitude relationship different from the first magnitude relationship, adjusting, based on the second magnitude relationship, the current threshold voltage, to obtain a first threshold voltage;

when a j-th page among the L pages and the M-th page satisfy a first inter-page sequence relationship among the N-th inter-page sequence relationships, and the memory cell is at the first threshold voltage, adjusts each bit in the j-th page from a current first bit as a second bit, j being a positive integer not larger than L; and adjusts, based on the second bit, a current probability value of probability of that each bit in the j-th page is represented as 0 or 1, as the first probability value.

13. The electronic device of claim 10, wherein the non-volatile memory:

when a current probability value of a bit in the M-th page is smaller than a first predetermined probability value, and it is determined that the bit in the M-th page has been inverted after being outputted by the decoder, determines a voltage value range of the memory cell; and obtains, based on the voltage value range and N−1 inter-page sequence relationships between reading the M-th page and reading the N−1 pages among the N pages except the M-th page, a probability value adjustment parameter for adjusting the current probability value of each bit among the L bits in the L pages.

14. The electronic device of claim 13, wherein the non-volatile memory adjusts, based on the probability value adjustment parameter, the current probability value of each bit among the L bits in the L pages in the memory cell as the first probability value.

15. The electronic device of claim 10, wherein the non-volatile memory obtains, based on N−1 inter-page relationships between the M-th page and the N−1 pages among the N pages except the M-th page, a voltage adjustment parameter for adjusting a current threshold voltage of the memory cell and a probability value adjustment parameter for adjusting the current probability value of each bit among the L bits in the L pages.

16. The electronic device of claim 15, wherein the non-volatile memory:

adjusts, based on the voltage adjustment parameter, a first magnitude relationship between the current threshold voltage of the memory cell and an actual voltage to which the memory cell corresponds as a second magnitude relationship different from the first relationship, adjusting, based on the second magnitude relationship, the current threshold voltage as a first threshold voltage, adjusting each bit among the L bits of the L pages from a current first bit into a second bit; and adjusts, based on the second bit and the probability value adjustment parameter, the current probability value of each bit among the L bits of the L page as the first probability value.

17. The electronic device of claim 10, wherein the non-volatile memory, when a current probability value of a bit in the M-th page is greater than a second predetermined probability value, and it is determined that the bit in the M-th page has been inverted after being outputted by the decoder, adjusts the current probability value of each bit among the N bits in the N pages in the memory cell as a first probability value indicating that each bit's probability of being represented as 0 or 1 is equal.

18. The electronic device of claim 10, wherein the non-volatile memory inputs the first probability value into the decoder.

19. An electronic device, comprising a first determining unit for determining, based on coding combination in a memory cell, an M-th page among N pages in the memory cell, wherein a number of inversion between 0 and 1 for two adjacent bits of the M-th page is less than a threshold value, the memory cell includes N bits, an i-th bit among the N bits is contained in an i-th page among the N pages, N being an integer greater than 1, i being an integer between 1 to N, M being a positive integer not greater than N;

a first obtaining unit for obtaining, based on N−1 inter-page relationships between the M-th page and N−1 pages among the N pages except the M-th page, a first parameter; and a first adjusting unit for adjusting, based on the first parameter, a current probability value of probability of that each bit of L bits corresponding to L pages among the N−1 pages is represented as 0 or 1, as a first probability value, L being a positive integer not greater than N−1.

* * * * *